(12) United States Patent
Grossman

(10) Patent No.: US 6,349,901 B1
(45) Date of Patent: Feb. 26, 2002

(54) LANDING GEAR

(75) Inventor: Stephen P. Grossman, El Segundo, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/651,487

(22) Filed: Aug. 30, 2000

(51) Int. Cl.⁷ ............................................. B64C 25/10
(52) U.S. Cl. ........................ 244/102 R; 244/102 SL
(58) Field of Search ................... 244/100 R, 102 R, 244/102 A, 102 SL, 102 SS

(56) References Cited

U.S. PATENT DOCUMENTS

| | | | | |
|---|---|---|---|---|
| 1,768,696 A | * | 7/1930 | Laddon | 244/102 R |
| 1,929,255 A | * | 10/1933 | Northrop | 244/102 R |
| 2,323,640 A | | 7/1943 | Armstrong | 244/102 |
| 2,331,082 A | | 10/1943 | Smith | 244/50 |
| 2,374,146 A | | 4/1945 | Waters | 244/102 |
| 2,471,603 A | | 5/1949 | Bishop | 244/102 |
| 2,982,500 A | | 5/1961 | Lucien | 244/102 |
| 3,083,937 A | | 4/1963 | Bainbridge et al. | 244/102 |
| 3,346,218 A | | 10/1967 | Lucien | 244/102 |
| 3,384,331 A | | 5/1968 | Palmer | 244/102 |
| 3,580,531 A | | 5/1971 | Bremen et al. | 244/102 |
| 3,870,254 A | | 3/1975 | Watts | 244/102 |
| 3,904,153 A | | 9/1975 | Watts | 244/50 |
| 3,951,361 A | | 4/1976 | Hrusch | 244/102 |
| 4,147,316 A | * | 4/1979 | Kendall et al. | 244/102 R |
| 4,170,332 A | | 10/1979 | Masclet et al. | 244/102 |
| 4,189,117 A | * | 2/1980 | Masclet et al. | 244/102 R |
| 4,199,119 A | | 4/1980 | Masclet | 244/102 |
| 4,228,975 A | | 10/1980 | Sealey | 244/102 |
| 4,312,485 A | | 1/1982 | Masclet et al. | 244/102 |
| 4,422,602 A | | 12/1983 | Turiot | 244/102 |
| 4,433,820 A | | 2/1984 | Turiot | 244/102 |
| 4,770,372 A | | 9/1988 | Ralph | 244/102 |
| 5,039,033 A | | 8/1991 | Woerner et al. | 244/102 |
| 5,478,030 A | | 12/1995 | Derrien et al. | 244/102 |
| 5,522,566 A | | 6/1996 | Hardy et al. | 244/137.1 |

FOREIGN PATENT DOCUMENTS

EP    0 115 435 A3    9/1984    ........... B64C/25/58

* cited by examiner

*Primary Examiner*—Peter M. Poon
*Assistant Examiner*—Timothy D. Collins
(74) *Attorney, Agent, or Firm*—Terry J. Anderson

(57) ABSTRACT

A landing gear (30) includes a trunnion (40) that has at least one principal pivot point (42). The principal pivot point (42) is adapted to be pivotably coupled to an airframe (12) to allow the trunnion (40) to pivot about a principal trunnion pivot axis (45). The trunnion (40) is operable to move between a deployed position and a stowed position by pivoting about the principal trunnion pivot axis (45). The landing gear (30) also includes a wheel (60) rotatably coupled to the trunnion (40). The wheel (60) has a rolling axis (68) and a center, which is located forward of the principal pivot point (42) when the trunnion (40) is in the deployed position.

30 Claims, 2 Drawing Sheets

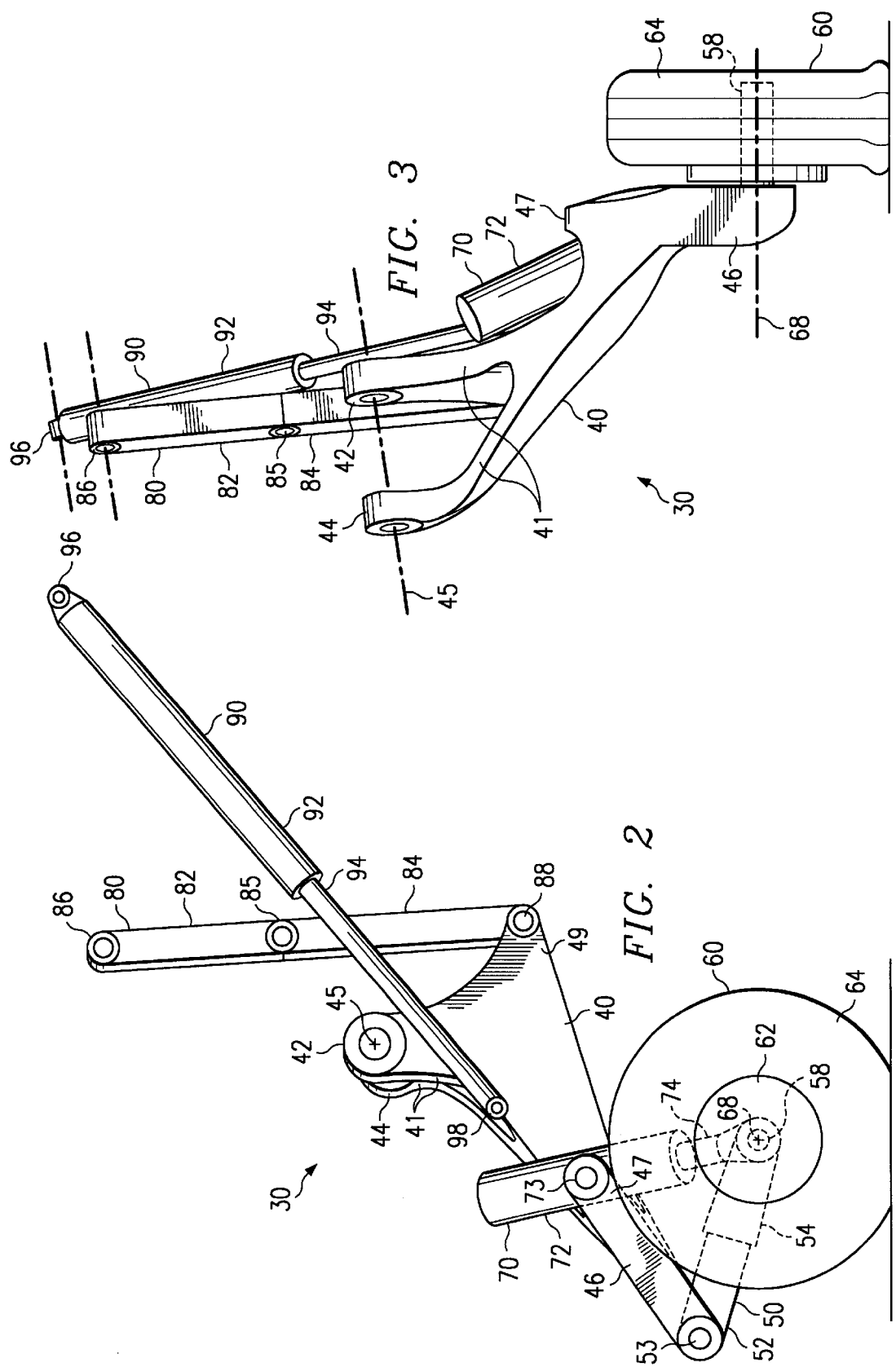

LANDING GEAR

TECHNICAL FIELD OF THE INVENTION

This invention relates generally to the field of aerospace structures and, more specifically, to landing gears.

BACKGROUND OF THE INVENTION

For the majority of their operation, landing gears are used to support an aircraft while it is stationary on the ground. However, landing gears must also be able to support the aircraft when it is landing and moving on the ground. Thus, landing gears must be designed to support not only the weight of the aircraft, but also the additional forces generated when the aircraft lands and moves on the ground.

The position in which each landing gear, when deployed, places their associated wheel(s) relative to the aircraft is also important to the design of the landing gears because the wheel positions affect the operation of the aircraft on the ground. For example, if the main landing gears place their associated wheel(s) too close to the longitudinal centerline of the aircraft, the aircraft will easily tip over onto its side. As another example, because the center of gravity of the aircraft is usually forward of the main landing gears' wheels, if the main landing gears place their associated wheel(s) too far aft on the aircraft, the aircraft will require large amounts of force to rotate upwards during takeoff, enlarging takeoff distances or horizontal control surfaces. Thus, landing gears must be designed to place the wheels in the appropriate position relative to the aircraft as well as support the aircraft during its different modes of operation on the ground.

In addition, the ability to stow the landing gears within the skin of the aircraft after takeoff is important in the design of many landing gears because it reduces the aerodynamic drag of the aircraft. Thus, having landing gears that are able to retract within the skin of the aircraft is often beneficial.

To accomplish the support, wheel positioning, and stowage objectives, most aircraft have the principal point at which each main landing gear pivotably couples to the aircraft forward of the appropriate deployed position for the associated wheel(s) and have the pivot axis of the landing gears parallel with the deployed orientation of the rolling axis of the associated wheel(s). In addition, aircraft usually have the center of each wheel located in a vertical plane that contains the principal point and is parallel to the longitudinal centerline of the aircraft.

Unfortunately, sometimes either the aircraft itself or another system in the aircraft, such as a weapons bay, dictates that the principal pivot points of the main landing gears should not be in the usual location. Thus, the main landing gears must be configured to couple to the aircraft at some other available location while still placing the associated wheel(s) in the appropriate position, which can present difficult support and stowage problems, or a sacrifice of aerodynamic performance and/or ground performance must be made, by not stowing the landing gears or by using less desirable wheel placements, respectively.

SUMMARY OF THE INVENTION

In accordance with the present invention, a landing gear is provided that substantially eliminates or reduces at least some of the disadvantages and problems associated with previously developed landing gears. Accordingly, in particular embodiments, the disclosed landing gear, when deployed, places the center of an associated wheel in a position that is forward and outboard of a principal point at which the landing gear pivotably couples to an airframe.

In certain embodiments of the present invention, the landing gear includes a trunnion and a wheel. The trunnion has at least one principal pivot point that is adapted to be pivotably coupled to an airframe to allow the trunnion to pivot about a principal trunnion pivot axis. The trunnion is operable to move between a deployed position and a stowed position by pivoting about the principal trunnion pivot axis. The wheel is rotatably coupled to the trunnion and has a rolling axis and a center, which is located forward of the principal pivot point when the trunnion is in the deployed position.

In other embodiments of the present invention, a method for using a landing gear is provided. The method includes pivoting a landing gear trunnion, which has a principal pivot point and a rotatably coupled wheel, relative to an airframe from a stowed position to a deployed position about a principal trunnion pivot axis, the center of the wheel being forward of the principal pivot point when the trunnion is in the deployed position. The method also includes dampening at least some of the forces applied to the wheel with a shock damper coupled to the trunnion and the wheel, the forces generating a first moment about the principal trunnion pivot axis. The method further includes generating a second moment about the principal trunnion pivot axis to counteract the first moment.

The present invention has several technical features and advantages. For example, in some embodiments, one advantage is the ability of a landing gear, when deployed, to place the center of a wheel associated with the landing gear forward of the principal point at which the landing gear pivotably couples to an airframe. Thus, the wheel may be placed in the appropriate position relative to the airframe even when the principal pivot point of the landing gear must be coupled to the airframe aft of the position where the center of the wheel is to be placed. As another example, in certain embodiments, an advantage is the ability of a landing gear, when deployed, to place the center of a wheel associated with the landing gear outboard of the principal point at which the landing gear pivotably couples to an airframe. Thus, the wheel may be placed in the appropriate position relative to the airframe even when the principal pivot point of the landing gear must be coupled to the airframe inboard of the position where the center of the wheel is to be placed. As a further example, in particular embodiments, an advantage is the ability of a landing gear, when deployed, to place the center of a wheel associated with the landing gear forward and outboard of the principal point at which the landing gear pivotably couples to an airframe. Thus, the wheel may be placed in the appropriate position relative to the airframe even when the principal pivot point of the landing gear must be coupled to the airframe aft and inboard of the position where the center of the wheel is to be placed. As another example, in certain embodiments, an advantage is the ability of a landing gear to be retracted into a stowed position within the skin of an airframe even when the principal point at which the landing gear pivotably couples to the airframe is inboard of the position at which the center of the wheel is to be placed upon deployment. Thus, the landing gear can still be retracted within the skin, which improves the aerodynamic characteristics of the aircraft.

The invention also has several useful technical features. For example, in several embodiments, the disclosed landing gear uses a locking member that is placed into tension when the aircraft is in contact with the ground. Using a locking member that is placed into tension provides a relatively strong locking mechanism and, moreover, allows the locking member to be composed of a series of links that can pivot relative to each other upon retraction of the landing gear, allowing the landing gear to be stowed in a relatively compact space. As another example, in particular embodiments, the disclosed landing gear has a relatively small number of components, allowing for easy manufacture, installation, and maintenance of the landing gear. As a further example, in several embodiments, the landing gear uses a box design for the trunnion, which reduces the weight of the landing gear with only a relatively modest decrease in strength.

Other technical features and advantages will be readily apparent to one of skill in the art from the following figures, description, and claims.

BRIEF DESCRIPTION OF THE DRAWINGS

For a more complete understanding of the present invention, and for further technical features and advantages, especially when considered in light of the following written description, reference is now made to the following figures, in which:

FIG. 2 shows an inboard looking view of the landing gear in FIG. 1 in the deployed position;

FIG. 3 shows an aft looking view of the landing gear in FIG. 1 in the deployed position.

DETAILED DESCRIPTION OF THE INVENTION

Figure 1:
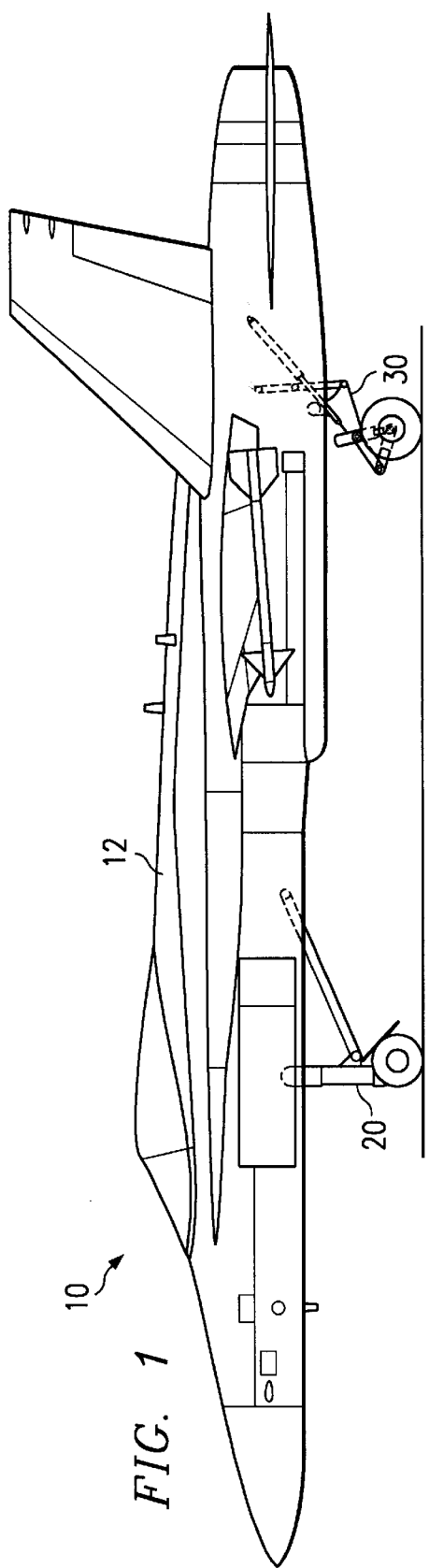
FIG. 1 illustrates a fighter aircraft utilizing a landing gear that is in accordance with the present invention.

FIG. 1 illustrates a fighter aircraft 10 utilizing a landing gear 30 that is in accordance with the present invention. As illustrated, landing gear 30 is a main landing gear of fighter aircraft 10. Landing gear 30, however, may be any type of landing gear. Fighter aircraft 10 also includes an airframe 12, a front landing gear 20, and a second main landing gear, which cannot be seen because it is hidden by landing gear 30 in FIG. 1. In particular embodiments, the second main landing gear is a mirror-image of landing gear 30 mirrored across the longitudinal centerline of fighter aircraft 10. Front landing gear 20, landing gear 30, and the second main landing gear couple to airframe 12 and support airframe 12 when fighter aircraft 10 is landing, moving, or stationary on the ground. Thus, front landing gear 20, landing gear 30, and the second main landing gear must be able to support not only the weight of fighter aircraft 10, but also the additional forces generated as fighter aircraft 10 lands and moves on the ground.

Airframe 12 may be composed of ribs, spars, struts, bulkheads, beams, skin, and/or any other suitable structural elements. In addition, airframe 12 may be composed of steel, aluminum, titanium, composite, and/or any other suitable material.

Front landing gear 20, landing gear 30, and the second main landing gear may be coupled to any of a variety of the structural elements of airframe 12. However, front landing gear 20, landing gear 30, and the second main landing gear are typically principally coupled to bulkheads of airframe 12. Further, front landing gear 20, landing gear 30, and the second main landing gear are usually pivotably coupled to airframe 12 so that retraction within the skin of airframe 12 is possible.

FIGS. 2 and 3 show an inboard looking view and an aft looking view, respectively, of landing gear 30 in the deployed position for the illustrated embodiment of the present invention. As illustrated, landing gear 30 includes a trunnion 40, a lever arm 50, a wheel 60, a shock damper 70, a locking member 80, and an actuator 90. As can be seen, landing gear 30 is illustrated as a single-stage trailing arm design. However, numerous other variations exist.

Trunnion 40 includes a yoke 41 with a first principal pivot point 42 and a second principal pivot point 44 at each end, respectively. First principal pivot point 42 and second principal pivot point 44 facilitate the coupling of trunnion 40 to airframe 12 and the pivoting of trunnion 40 relative to airframe 12 about a principal trunnion pivot axis 45, which may pass through the principal pivot point(s), as illustrated. Note, while principal trunnion pivot axis 45 is illustrated as being horizontally and vertically skewed relative to the lateral axis of airframe 12, principal trunnion pivot axis 45 may have a variety of orientations. By pivoting about principal trunnion pivot axis 45, trunnion 40 pivots between a stowed and a deployed position. In the deployed position, which is shown in FIGS. 2 and 3, trunnion 40 extends forward and outboard from first principal pivot point 42 and second principal pivot point 44. At the forward end of trunnion 40, trunnion 40 has a lip 46 for coupling to lever arm 50. Trunnion 40 also includes a lip 47 for coupling to shock damper 70 and a flange 49 for coupling to locking member 80.

As illustrated, first principal pivot point 42 and second principal pivot point 44 each include an aperture through which a pin may be inserted to pivotably couple trunnion 40 to airframe 12. However, first principal pivot point 42 and second principal pivot point 44 may be pins, shafts, axles, sleeves, sockets, and/or any other device that allows an element to pivot relative to a coupled element with a prescribed degree of freedom. Moreover, in particular embodiments, any number of principal pivot points could be used for coupling trunnion 40 to airframe 12. Additionally, the coupling points—lip 46, lip 47, and flange 49—may be any type of device that assists in coupling one structural component to another structural component and may be arranged in a variety of manners on trunnion 40.

Trunnion 40 may be composed of titanium, steel, aluminum, composite, and/or any other suitable material. Additionally, trunnion 40 may be manufactured as a solid member or as a hollow member. In a particular embodiment, trunnion 40 is manufactured as a box section. Manufacturing trunnion 40 as a hollow member has the advantage of reducing the weight of trunnion 40 with only a relatively modest decrease in strength. Yoke 41, lip 46, lip 47, and flange 49 may be arranged in various manners on trunnion 40. In addition, various other structural elements well known to those skilled in the art may be substituted for them.

Lever arm 50 couples wheel 60 to trunnion 40 and has a first end 52 and a second end 54. At first end 52, lever arm 50 is pivotably coupled to trunnion 40 by a pivotable coupler 53, and at second end 54, lever arm 50 is rotatably coupled to wheel 60 by an axle 58. Pivotable coupler 53 may be a pin, a shaft, an axle, a sleeve, a socket, and/or any other device that allows an element to pivot relative to a coupled element with a prescribed degree of freedom. Axle 58 may be coupled to wheel 60 by any of a variety of mechanisms well known to those of skill in the art.

Lever arm 50 may be a rod, a strut, a shaft, or any other suitable support device. In addition, lever arm 50 may be composed of steel, aluminum, titanium, composite, and/or any other suitable material.

Wheel 60 includes a hub 62 and a tire 64. Hub 62 rotatably couples to axle 58, and tire 64 mounts to hub 62.

Wheel 60 has a rolling axis 68 that passes through the center of hub 62, and, hence, axle 58. Rolling axis 68 is typically substantially perpendicular to the longitudinal centerline of airframe 12. Wheel 60 may be composed of any of a variety of materials and/or in any of a variety of manners well known to those of skill in the art.

Although axle 58 has been illustrated as being a part of lever arm 50, axle 58 could instead be a part of wheel 60, coupled to hub 62. In this embodiment, axle 58 would rotate with hub 62 of wheel 60 and be captured in an aperture in lever arm 50. Other couplings well known to those of skill in the art could also be used to rotatably couple lever arm 50 and wheel 60.

Also coupling wheel 60 to trunnion 40 is shock damper 70. Shock damper 70 includes a chamber 72 and a piston 74. Chamber 72 provides variable resistance to piston 74 as piston 74 is inserted into chamber 72. To accomplish this, chamber 72 may include a gas, a liquid, a mechanical device, such as a spring, and/or any other mechanism for absorbing shocks. Note, in general, shock damper 70 may be any device that lessens the shock to landing gear 30 when abrupt forces are applied to wheel 60. As illustrated, chamber 72 of shock damper 70 is pivotably coupled to trunnion 40 by a pivotable coupler 73, and piston 74 is pivotably coupled to lever arm 50. These couplings may be pins, shafts, axles, sleeves, sockets, and/or any other device that allows an element to pivot relative to a coupled element with a prescribed degree of freedom. Shock damper 70 may be composed of any of a variety of materials well known to those skilled in the art.

Although the coupling between trunnion 40 and wheel 60 has been illustrated and described as being achieved by lever arm 50 and shock damper 70, a variety of other mechanisms exist for coupling wheel 60 to trunnion 40. For example, wheel 60 could be directly coupled to trunnion 40 by pivotable coupler 53, without the aid of lever arm 50 and shock damper 70. In other embodiments, wheel 60 could be coupled to trunnion 40 forward of pivotable coupler 53. Thus, there are a variety of manners in which to couple wheel 60 to trunnion 40 that are in accordance with the invention. Furthermore, in particular embodiments, landing gear 30 may have multiple wheels.

Locking member 80 couples to trunnion 40 and is adapted to be coupled to airframe 12. In general, locking member 80 prevents trunnion 40 from pivoting about principal trunnion pivot axis 45 when landing gear 30 is supporting airframe 12. In the illustrated embodiment, locking member 80 accomplishes this function by being placed into tension when landing gear 30 is supporting airframe 12.

As illustrated, locking member 80 includes a first link 82 and a second link 84. First link 82 is pivotably coupled to second link 84 by a pivotable coupler 85. First link 82 also includes a pivotable coupler 86, which is adapted to pivotably couple to airframe 12. Additionally, second link 84 includes a pivotable coupler 88, which is pivotably coupled to trunnion 40. Pivotable coupler 85, pivotable coupler 86, and pivotable coupler 88 may be pins, shafts, axles, sleeves, sockets, and/or any other type of device that allows an element to pivot relative to a coupled element with a prescribed degree of freedom. First link 82 and second link 84 may be composed of aluminum, steel, titanium, composite, and/or any other suitable material. In particular embodiments, first link 82 and second link 84 are shaped as I-beams.

In certain embodiments, an actuator could be coupled to pivotable coupler 85, first link 82, and/or second link 84. This actuator would facilitate the pivoting of first link 82 relative to second link 84 when trunnion 40 begins to pivot from the deployed position. In addition, this actuator could serve to lock pivotable coupler 85 into place upon the deployment of landing gear 30. The actuator may be a hydraulic actuator or any other type of actuator well known to those of skill in the art.

In other embodiments, locking member 80 may have a different number of links. For example, locking member 80 may have only one link, meaning that locking member 80 is a rigid member, or a plurality of links, such as a chain. In general, therefore, locking member 80 may have any configuration that can support tensile loads to prevent trunnion 40 from pivoting about principal trunnion pivot axis 45. In other embodiments, however, locking member 80 could support compressive loads to prevent trunnion 40 from pivoting about principal trunnion pivot axis 45.

Actuator 90 couples to trunnion 40 and is adapted to couple to airframe 12 to move it between the deployed and stowed positions. To accomplish this, actuator 90, as illustrated, includes a chamber 92 and a piston 94. Chamber 92 actuates piston 94 hydraulically, pneumatically, electrically, and/or by any other manner to cause piston 94 to extend and retract. By extending and retracting piston 94, actuator 90 causes trunnion 40 to pivot about principal trunnion pivot axis 45. In general, therefore, actuator 90 may be any device that can cause trunnion 40 to pivot about principal trunnion pivot axis 45. As illustrated, actuator 90 is adapted to couple to airframe 12 by a pivotable coupler 96 and is coupled to trunnion 40 by a pivotable coupler 98. Pivotable coupler 96 and pivotable coupler 98 may be pins, shafts, axles, sleeves, sockets, and/or any other type of device that allows an element to pivot relative to a coupled element with a prescribed degree of freedom. Actuator 90 may be composed of any suitable material.

In operation, landing gear 30 supports airframe 12 while landing, moving, and stationary on the ground. During landing, when wheel 60 is not in contact with the ground, trunnion 40, and, hence, wheel 60, is in the deployed position, and piston 74 of shock damper 70 is extended. As wheel 60 touches the ground, however, an upward force is generated on wheel 60. This force pushes piston 74 into chamber 72, where the dampening mechanism dampens the shock of the force applied to trunnion 40. This force also creates a moment about principal trunnion pivot axis 45. This moment, however, is counteracted by locking member 80, which is placed into tension due to the moment. As fighter aircraft 10 comes into continuous contact with the ground, piston 74 is forced into chamber 72 until it reaches an equilibrium point, and locking member 80 has a continuous tension applied to it.

As illustrated in FIGS. 2 and 3, landing gear 30 has several advantages. As best shown in FIG. 3, when deployed, trunnion 40 of landing gear 30 places the center of wheel 60 approximately twenty-two inches outboard of first principal pivot point 42. Thus, trunnion 40 allows the center of wheel 60 to be placed outboard of the principal point at which landing gear 30 pivotably couples to airframe 12. In addition, as best shown in FIG. 2, when deployed, trunnion 40 places the center of wheel 60 approximately ten inches forward of second principal pivot point 44. Thus, trunnion 40 allows the center of wheel 60 to be placed forward of the principal point at which landing gear 30 pivotably couples to airframe 12. Moreover, trunnion 40 allows the center of wheel 60 to be placed forward and outboard of the principal point at which landing gear 30 pivotably couples to airframe 12. In other embodiments, however, the shape of trunnion 40 may be modified to place the center of wheel 60 in different positions relative to the principal point where landing gear 30 pivotably couples to airframe 12. Furthermore, in particular embodiments, trunnion 40 may only place the center of wheel 60 either forward or outboard of the principal point at which landing gear 30 pivotably couples to airframe 12.

Additionally, landing gear 30 has several usefull technical features. For example, locking member 80 of landing gear 30 is placed into tension when landing gear 30 is supporting aircraft 10. Using a locking member that is placed into tension provides a relatively strong locking mechanism and, moreover, allows the locking member to be composed of a series of links that can pivot relative to each other upon retraction of the landing gear, allowing the landing gear to be stowed in a relatively compact space. Note, a locking member such as locking member 80 may be used in a variety of embodiments of Applicants' invention. As another example, landing gear 30 has a relatively small number of components, which allows for easy manufacture, installation, and maintenance. In other embodiments, however, a landing gear in accordance with the present invention may have a relatively large number of components.

Figure 4:
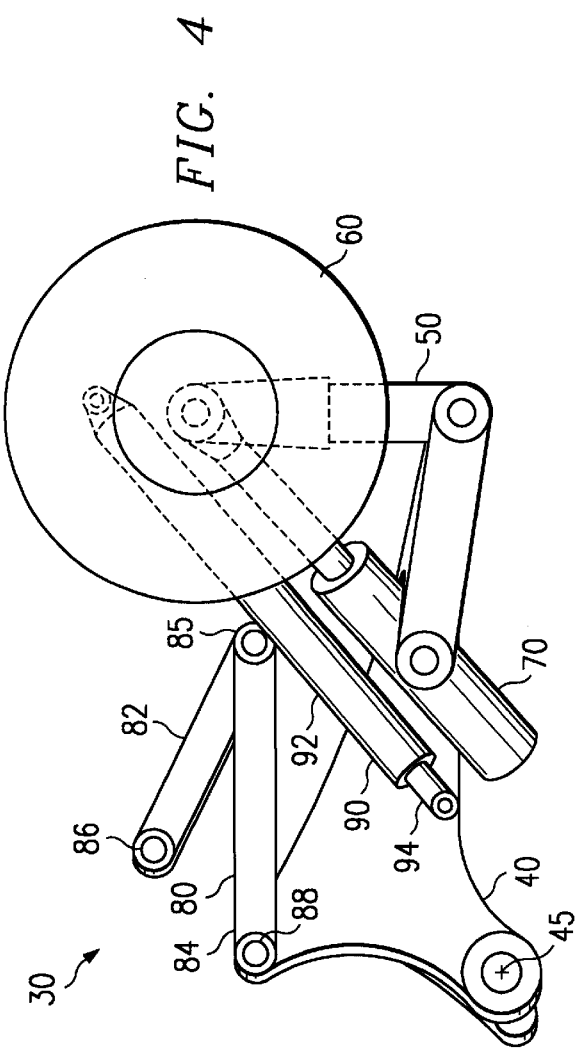
FIG. 4 shows an inboard looking view of the landing gear in FIG. 1 in the stowed position.

FIG. 4 shows an inboard looking view of landing gear 30 in the stowed position. To place landing gear 30 in this position, actuator 90 retracts piston 94 into chamber 92. Due to this retraction, trunnion 40 pivots about principal trunnion pivot axis 45. Also due to this retraction, first link 82 and second link 84 of locking member 80 pivot relative to each other about pivotable coupler 85. In addition, first link 82 pivots relative to airframe 12 about pivotable coupler 86, and second link 84 pivots relative to trunnion 40 about pivotable coupler 88.

Furthermore, wheel 60, along with lever arm 50 and shock damper 70, moves inboard during the retraction to the stowed position. This inboard movement allows landing gear 30 to be stowed within the skin of airframe 12 even when wheel 60 is positioned outboard of the principal point at which landing gear 30 pivotably couples to airframe 12. As illustrated, this movement occurs because principal trunnion pivot axis 45 is skewed approximately ten degrees laterally and approximately ten degrees vertically relative to rolling axis 68 of wheel 60, when deployed, as shown in FIG. 3. The vertical skew and the horizontal skew of principal trunnion pivot axis 45 may be adjusted as needed, by reconfiguring trunnion 40, to achieve the appropriate inboard movement during retraction. In particular embodiments, however, principal trunnion pivot axis 45 may be skewed either laterally or vertically relative to rolling axis 68 of wheel 60, when deployed. In other embodiments, however, principal trunnion pivot axis 45 may be substantially parallel with rolling axis 68 of wheel 60, when deployed.

To deploy landing gear 30, actuator 90 extends piston 94. This extension causes trunnion 40 to again pivot about principal trunnion pivot axis 45, this time, however, in the opposite direction. This pivoting, in turn, causes first link 82 to pivot relative to second link 84 about pivotable coupler 85 and wheel 60 to move outboard relative to airframe 12. Piston 94 is extended until landing gear 30 is in the deployed position, as shown in FIG. 2.

Although landing gear 30 has been illustrated as being useful in fighter aircraft 10, landing gear 30 could also be useful in any other type of military or commercial aircraft. In addition, landing gear 30 could also be useful in any type of aircraft, not just airplanes.

Although several embodiments of the present invention have been discussed, numerous additions, deletions, substitutions, and/or alterations to the invention may be readily suggested to one of skill in the art without departing from the scope of the present invention. It is intended, therefore, that the appended claims encompass such additions, deletions, substitutions, and/or alterations.

What is claimed is:

1. A landing gear, comprising:
   a trunnion having at least one principal pivot point, the principal pivot point adapted to be pivotably coupled to an airframe to allow the trunnion to pivot about a principal trunnion pivot axis, the trunnion operable to move between a deployed position and a stowed position by pivoting about the principal trunnion pivot axis; and
   a wheel rotatably coupled to the trunnion, the wheel having a rolling axis and a center, the center located forward of the principal pivot point when the trunnion is in the deployed position.

2. The landing gear of claim 1, wherein the center of the wheel is located at least nine inches forward of the principal pivot point when the trunnion is in the deployed position.

3. The landing gear of claim 1, wherein the center of the wheel is located at least twenty inches outboard of the principal pivot point when the trunnion is in the deployed position.

4. The landing gear of claim 1, wherein the principal trunnion pivot axis is skewed relative to the rolling axis of the wheel when the trunnion is in the deployed position.

5. The landing gear of claim 1, further comprising a locking member coupled to the trunnion and adapted to be coupled to the airframe, the locking member preventing the trunnion from pivoting about the principal trunnion pivot axis when the wheel is supporting the airframe.

6. The landing gear of claim 5, wherein the locking member prevents the trunnion from pivoting about the principal trunnion pivot axis by being placed into tension.

7. The landing gear of claim 5, wherein the locking member is coupled to the trunnion aft of the principal pivot point when the trunnion is in the deployed position.

8. The landing gear of claim 5, wherein the locking member comprises two pivotably coupled links.

9. The landing gear of claim 1, further comprising an actuator coupled the trunnion and adapted to be coupled to the airframe, the actuator operable to move the trunnion between the deployed position and the stowed position by pivoting the trunnion about the principal trunnion pivot axis.

10. The landing gear of claim 1, wherein the wheel is rotatably coupled to the trunnion by a lever arm having a first end and a second end, the lever arm pivotably coupled to the trunnion at the first end and rotatably coupled to the wheel at the second end.

11. The landing gear of claim 10, wherein the first end of the lever arm is forward of the center of the wheel when the trunnion is in the deployed position.

12. The landing gear of claim 10, further comprising a shock damper coupled between the trunnion and the lever arm.

13. The landing gear of claim 1, further comprising:
   a locking member coupled to the trunnion and adapted to be coupled to the airframe, the locking member placed into tension when the wheel is supporting the airframe;
   an actuator coupled to the trunnion and adapted to be coupled to the airframe, the actuator operable to move the trunnion between the deployed position and the stowed position by pivoting the trunnion about the principal trunnion pivot axis;

a lever arm having a first end and a second end, the lever arm pivotably coupled to the trunnion at the first end and rotatably coupled the wheel at the second end; and a shock damper coupled between the trunnion and the lever arm.

14. A method for using a landing gear, comprising:

pivoting a landing gear trunnion, having a principal pivot point and a rotatably coupled wheel, relative to an airframe from a stowed position to a deployed position about a principal trunnion pivot axis, the center of the wheel being forward of the principal pivot and outboard point when the trunnion is in the deployed position;

dampening at least some of the forces applied to the wheel with a shock damper coupled between the trunnion and the wheel, the forces generating a first moment about the principal trunnion pivot axis; and generating a second moment about the principal trunnion pivot axis to counteract the first moment.

15. The method of claim 14, wherein generating a second moment comprises placing a locking member into tension.

16. The method of claim 15, further comprising locking the locking member into position after the trunnion has pivoted into the deployed position.

17. The method of claim 14, wherein the principal trunnion pivot axis is skewed relative to the rolling axis of the wheel when the trunnion is in the deployed position.

18. An aircraft having a landing gear, comprising:

an airframe; and a landing gear coupled to the airframe, the landing gear comprising:

a trunnion having at least one principal pivot point pivotably coupled to the airframe to allow the trunnion to pivot about a principal trunnion pivot axis, the trunnion operable to move between a deployed position and a stowed position by pivoting about the principal trunnion pivot axis; and a wheel rotatably coupled to the trunnion, the wheel having a rolling axis and a center, the center located forward and outboard of the principal pivot point when the trunnion is in the deployed position.

19. The aircraft of claim 18, wherein the center of the wheel is located at least nine inches forward of the principal pivot point when the trunnion is in the deployed position.

20. The aircraft of claim 18, wherein the center of the wheel is located at least twenty inches outboard of the principal pivot, point when the trunnion is in the deployed position.

21. The aircraft of claim 18, wherein the principal trunnion pivot axis is skewed relative to the rolling axis of the wheel when the trunnion is in the deployed position.

22. The aircraft of claim 18, further comprising a locking member coupled to the trunnion and coupled to the airframe, the locking member preventing the trunnion from pivoting about the principal trunnion pivot axis when the wheel is supporting the airframe.

23. The aircraft of claim 22, wherein the locking member prevents the trunnion from pivoting about the principal trunnion pivot axis by being placed into tension.

24. The aircraft of claim 22, wherein the locking member is coupled to the trunnion aft of the principal pivot point when the trunnion is in the deployed position.

25. The aircraft of claim 22, wherein the locking member comprises two pivotably coupled links.

26. The aircraft of claim 18, further comprising an actuator coupled to the trunnion and coupled to the airframe, the actuator operable to move the trunnion between the deployed position and the stowed position by pivoting the trunnion about the principal trunnion pivot axis.

27. The aircraft of claim 18, wherein the wheel is rotatably coupled to the trunnion by a lever arm having a first end and a second end, the lever arm pivotably coupled to the trunnion at the first end and rotatably coupled to the wheel at the second end.

28. The aircraft of claim 27, wherein the first end of the lever arm is forward of the center of the wheel when the trunnion is in the deployed position.

29. The aircraft of claim 27, further comprising a shock damper coupled between the trunnion and the lever arm.

30. The aircraft of claim 20, further comprising:

a locking member coupled to the trunnion and coupled to the airframe, the locking member placed into tension when the wheel is supporting the airframe;

an actuator coupled to the trunnion and coupled to the airframe, the actuator operable to move the trunnion between the deployed position and the stowed position by pivoting the trunnion about the principal trunnion pivot axis;

a lever arm having a first end and a second end, the lever arm pivotably coupled to the trunnion at the first end and rotatably coupled to the wheel at the second end; and a shock damper coupled between the trunnion and the lever arm.

* * * * *